EXAMINER

BEST AVAILABLE COPY

Orig. Issue July 11-54.

J. Kedzie

Water Filter.

No. 1498. Reissued June 16, 1863.

Witnesses:
R. F. Osgood.
W. R. Porter.

Inventor:
John Kedzie

N. PETERS, PHOTO-LITHOGRAPHER, WASHINGTON, D. C.

UNITED STATES PATENT OFFICE.

JOHN KEDZIE, OF ROCHESTER, NEW YORK.

IMPROVEMENT IN FILTERS.

Specification forming part of Letters Patent No. 10,420, dated January 10, 1854; Reissue No. 1,498, dated June 16, 1863.

*To all whom it may concern:*

Be it known that I, JOHN KEDZIE, of Rochester, in the county of Monroe and State of New York, did invent a new and useful Improvement in the Construction of Filters, for which Letters Patent of the United States were granted to me on the 10th day of January, 1854; and I do hereby declare that the following is a full and exact description thereof, reference being had to the accompanying drawings, making part of this specification.

Figure 2:
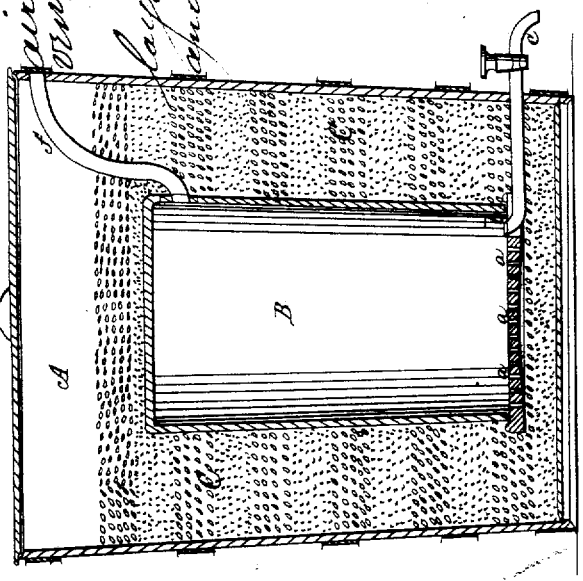
Figure 3:
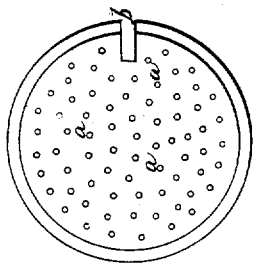
Figure 1:
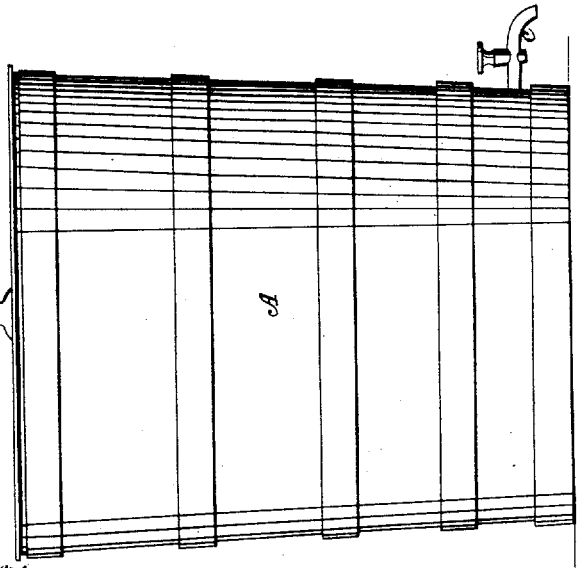

Figure 1 is an elevation of my improved filter; Fig. 2, a central vertical section thereof; Fig. 3, a plan of the detachable bottom of the inclosed crock when made in two parts.

Like letters of reference indicate corresponding parts in all the figures.

My improved filter is of that class in which a tub or receptacle is used, containing filtering material or packing, for the purification of considerable quantities of water.

My invention consists of a crock or vessel situated within an outer tub or receptacle, with the packing surrounding its sides, said crock having perforations at its bottom for admitting the water and an eduction-pipe for discharging it, and having also a communication at its top with the outside for the escape of air from within, all substantially as hereinafter described.

The tub or receptacle A may be of any desirable form and size, and made of any suitable material, such as oak. In the axis, or nearly so, of this tub, but with its base near the bottom of the tub, is situated a crock or jar, B, the space intervening with it and the sides of the tub being filled with filtering material or packing, C, which is preferably composed of layers of gravel and charcoal, reaching to a suitable height, but leaving an open space at the top, as represented in Fig. 2.

The bottom of the crock is provided with small perforations *a a*, of such size as to allow water to flow through, but still to exclude particles of the packing. The water enters in the direction opposite its gravity, and consequently foreign matter would not be so liable to find ingress. In the drawings the bottom of the crock is represented as detachable, the crock resting on it. If the bottom of the crock were made entire and undetachable, the same effect of the perforations *a a* would be produced. Through the bottom of the crock, on one side, is made a hole, *b*, Figs. 2 and 3, of suitable size and shape to receive the end of an eduction-pipe, *c*, passing outward through the packing and the side of the tub, and which may be provided with a suitable cock for cutting off the flow.

The upper end of the crock has a suitable communication with the outer air, either outside the tub or above the packing, in order to allow the air in the crock to escape as the water enters through the perforations to occupy the space; or, vice versa, to allow it to enter to fill the vacuum, as the water is drawn off through the eduction-pipe. I prefer a pipe, *f*, Fig. 2, for this purpose, one end of which is joined to the top of the crock and the other passes out through the side of the tub. It is apparent that if an opening were provided in the top of the crock and the latter extended above the packing, the same effect would be accomplished.

Among the advantages of this arrangement are the following:

First. It is exceedingly cheap and simple, consisting of but three principal parts—viz., the outer tub, the packing, and the crock. The expense of partitions for dividing the filtered water from the packing, and for separating the layers of packing from each other, as in many English filters, is avoided. The particular arrangement of parts enables me to make the tub of circular shape in cross-section, such being much easier and cheaper to make than if the shape were square or otherwise.

Second. I obtain the benefit of a greater degree of filtration than in ordinary devices, or, in other words, the benefit of a greater distance of passage of the water through the packing. It passes nearly the whole height of the packing before it reaches the perforations *a a*. I am not aware of so simple a device in which so great a degree of filtration is obtained.

Third. The perforations *a a* at the bottom of the crock serve as a kind of secondary filter by admitting the water without impurities. Their position is such that the passage of any substance is opposed to gravitation; therefore the gravel, which is heavier than water, will have no tendency to enter.

BEST AVAILABLE COPY

Fourth. I am enabled to draw off water from the filter, even if there be but a very small quantity in the tub, since the bottom of the crock is situated near the base of the tub and the eduction-pipe opens directly from the bottom of said crock. In many devices the water can only be drawn at a distance above the bottom, so that a large quantity must stand in the tub at all times. In others the water has to be forced upward by positive action through the porous stone or packing, and drawn off at a distance above the bottom.

Fifth. The packing insulates the crock in such a manner as to keep it cool in summer, the effect being produced not only by the thickness of the packing itself, but also by the evaporation of the water that rests near the sides of the tub, outside the crock. This has the tendency to withdraw the heat from the center and to keep the water at that point cool. I consider this effect of great consequence, and it can be produced only where the crock is surrounded at the sides by the packing. I am not aware that a device combining this effect with the others before mentioned was ever known before my invention.

Sixth. The form and construction of this filter is such that it is more portable than ordinary devices, there being no projecting parts to receive injury, and it being made of wood, so as not to be easily broken. In many filters it is very difficult to transport them, on account of their being made of material easily broken, or on account of their construction.

I am aware that filters have before been known in which the water passes through packing to purify it, and such, broadly, I do not claim; but I am not aware that an insulated vessel, extending nearly to the base of the outer receptacle and provided with perforations in its bottom for the admission of water, and with an eduction-pipe at its bottom and an air-communication at the top, was ever known prior to my invention.

What I claim as my invention, and desire to secure by Letters Patent, is—

A crock, B, provided with perforations *a a* and the eduction-pipe *c* at its bottom, and communicating with the outer air at the top by means of the pipe *f*, or in an equivalent manner, said crock being used in combination with the surrounding packing C, and receptacle A, substantially as herein set forth.

In witness whereof I have hereunto set my hand this 23d day of April, 1863.

JOHN KEDZIE.

Witnesses:
R. F. OSGOOD,
W. A. LODER.